(12) United States Patent
Kang et al.

(10) Patent No.: US 8,649,101 B2
(45) Date of Patent: Feb. 11, 2014

(54) PROJECTION APPARATUS

(75) Inventors: Yi-Hao Kang, Hsin-Chu (TW); Yi-Hsueh Chen, Hsin-Chu (TW); Ching-Yi Chen, Hsin-Chu (TW)

(73) Assignee: Young Optics Inc., Hsin-Chu (TW)

( * ) Notice: Subject to any disclaimer, the term of this patent is extended or adjusted under 35 U.S.C. 154(b) by 100 days.

(21) Appl. No.: 12/859,574

(22) Filed: Aug. 19, 2010

(65) Prior Publication Data

US 2012/0044586 A1  Feb. 23, 2012

(51) Int. Cl.
*G02B 3/00* (2006.01)
*G02B 9/00* (2006.01)

(52) U.S. Cl.
USPC ........................................................ 359/649

(58) Field of Classification Search
USPC .................. 359/649–651, 642, 717
See application file for complete search history.

(56) References Cited

U.S. PATENT DOCUMENTS

| 6,273,568 B1 | 8/2001 | Okuyama | |
|---|---|---|---|
| 7,517,094 B2 * | 4/2009 | Piehler | 353/97 |
| 2003/0107715 A1 * | 6/2003 | Wang | 353/98 |
| 2004/0130799 A1 * | 7/2004 | Kreitzer | 359/651 |

FOREIGN PATENT DOCUMENTS

| TW | 457396 | 10/2001 |
|---|---|---|
| TW | 494270 | 7/2002 |
| TW | 200732812 | 9/2007 |

* cited by examiner

*Primary Examiner* — Alicia M Harrington
(74) *Attorney, Agent, or Firm* — WPAT, PC; Justin King

(57) ABSTRACT

A projection apparatus includes an illumination system providing an illumination light beam, a light valve disposed in a transmission path of the illumination light beam and converting the illumination light beam into an image light beam, a projection lens disposed in a transmission path of the image light beam, a first field lens, and a second field lens. The first field lens and the second field lens are disposed between the light valve and the projection lens and in the transmission paths of the illumination light beam and the image light beam. The first field lens is a positive meniscus lens with a first concave surface facing the projection lens. The second field lens is a positive meniscus lens with a second concave surface adjacent to the first field lens. The projection apparatus is capable of reducing a ghost image.

6 Claims, 3 Drawing Sheets

PROJECTION APPARATUS

BACKGROUND

1. Field of the Invention

The invention relates to a display apparatus, and more particularly, to a projection apparatus.

2. Description of the Related Art

A field lens for a projection apparatus is disclosed in a number of patents such as U.S. Pat. No. 6,273,568, US patent No. 2007/0279602, US patent No. 2007/0273979, U.S. Pat. No. 6,888,682, Taiwanese patent No. 494270, and Taiwanese patent No. 457396. The field lens is configured for reducing an incident angle of an illumination light beam which is incident to a light valve to prevent the light valve from being overfilled by the illumination light beam and thereby improving light utility efficiency. Moreover, with a filed lens, a projection lens could have shorter back focal length, which is able to be used in the projection apparatus and the size of the projection apparatus could be reduced thereby.

However, when a transmittance of the field lens is less than 100%, a portion of the illumination light beam may be reflected by the field lens. The reflected light beam (i.e. stray light beam) reflected from the field lens may be reflected to the projection lens and then be projected on a screen, and therefore a ghost image is displayed on the screen. The ghost image reduces display quality of the projection apparatus, so that it is important to reduce the ghost image.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF SUMMARY

The invention provides a projection apparatus to reduce a ghost image.

To achieve at least one of the above-mentioned advantages, a projection apparatus is provided according to one embodiment of the invention. The projection apparatus includes an illumination system, a light valve, a projection lens, a first field lens, and a second field lens. The illumination system is capable of providing an illumination light beam. The light valve is disposed in a transmission path of the illumination light beam and is capable of converting the illumination light beam into an image light beam. The projection lens is disposed in a transmission path of the image light beam. The first field lens is disposed between the light valve and the projection lens and in the transmission path of the illumination light beam and the transmission path of the image light beam. The first field lens is a positive meniscus lens with a first concave surface facing the projection lens. The second field lens is disposed between the light valve and the first field lens and in the transmission path of the illumination light beam and the transmission path of the image light beam. The second field lens is a positive meniscus lens with a second concave surface adjacent to the first field lens.

In one embodiment of the invention, the first field lens and the second field lens are spherical lenses.

In one embodiment of the invention, the first field lens and the second field lens are aspheric lenses.

In one embodiment of the invention, one of the first field lens and the second field lens is a spherical lens and the other one of the first field lens and the second field lens is an aspheric lens.

In one embodiment of the invention, an optical axis of the illumination light beam passes through a predetermined portion of the first concave surface, and an included angle between the optical axis of the illumination light beam and a normal line of the predetermined portion of the first concave surface is greater than an effective light receiving angle of the projection lens.

In one embodiment of the invention, an absolute value of the effective light receiving angle of the projection lens is between zero and 20 degrees, the included angle between the optical axis of the illumination light beam and the normal line of the predetermined portion of the first concave surface is between 20 degrees and 40 degrees, and a radius of curvature of the first concave surface is smaller than or equal to 250 millimeters and greater than zero.

In the projection apparatus of the invention, the first field lens has the first concave surface facing the projection lens. Although a portion of the illumination light beam may be reflected by the first concave surface, the reflected light beam (i.e. stray light beam) reflected by the first concave surface could deviate from a light receiving angle of the projection lens, and therefore ghost images could be reduced. Moreover, the second field lens could reduce aberration, so as to improve display quality of the projection apparatus of the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
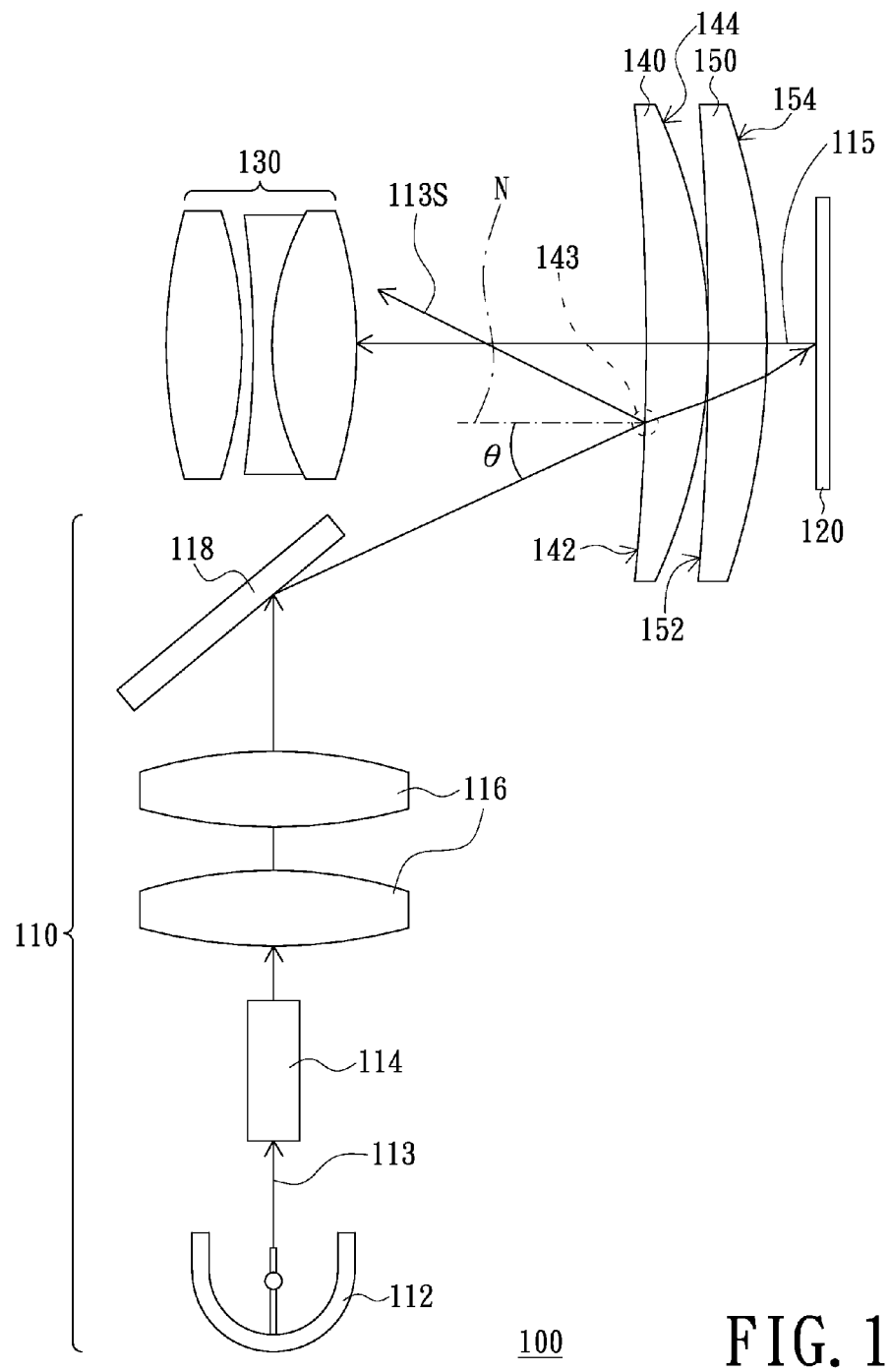
FIG. 1 is a schematic view of a projection apparatus according to one embodiment of the invention.

FIG. 1 is a schematic view of a projection apparatus according to one embodiment of the invention. Referring to FIG. 1, the projection apparatus 100 of the embodiment includes an illumination system 110, a light valve 120, a projection lens 130, a first field lens 140 and, a second field lens 150. The illumination system 110 provides an illumination light beam 113. In FIG. 1, the light valve 120 is disposed in a transmission path of the illumination light beam 113 and converts the illumination light beam 113 into an image light beam 115. In FIG. 1, the projection lens 130 is disposed in a transmission path of the image light beam 115 and projects the image light beam 115 onto a screen (not shown). The first field lens 140 is disposed between the light valve 120 and the projection lens 130 and in the transmission path of the illumination light beam 113 and the transmission path of the image light beam 115. The first field lens 140 is a positive meniscus lens with a first concave surface 142 facing the projection lens 130. The second field lens 150 is disposed between the light valve 120 and the first field lens 140 and in the transmission path of the illumination light beam 113 and the transmission path of the image light beam 115. The second field lens 150 is a positive meniscus lens with a second concave surface 152 adjacent to the first field lens 140.

In the projection apparatus 100, the illumination system 110 includes, for example, a light source 112, a light integration rod 114, relay lenses 116, and a reflective element 118. The light source 112 provides the illumination light beam 113, the light integration rod 114 evens the illumination light beam 113, the relay lenses 116 condense the illumination light beam 113, and the reflective element 118 reflects the illumination light beam 113 to the light valve 120. It should be noted that components of the illumination system 110 are not limited to above-mentioned components. Moreover, the light valve 120 could be, but not limited to, a digital micro-mirror device (DMD) or a liquid crystal on silicon panel (LCOS panel).

The first field lens 140 and the second field lens 150 could be spherical lenses or aspheric lenses. In another embodiment, one of the first field lens 140 and the second field lens 150 is a spherical lens and the other one of the first field lens 140 and the second field lens 150 is an aspheric lens. For example, the first field lens 140 is a spherical lens and the second field lens 150 is an aspheric lens.

When an incident angle of a light beam which is incident to the projection lens is smaller than or equal to an effective light receiving angle of the projection lens 130, the light beam could be projected onto the screen. In other words, when the incident angle is greater than the effective light receiving angle of the projection lens 130, the light beam could not be projected onto the screen. For stray light beams reflected from each surfaces of the field lens, the stray light beam reflected from the surface nearest the projection lens is most relevant to the ghost image. In other words, when the stray light beam reflected from the surface nearest the projection lens is projected onto the screen, the ghost image is obvious. In view of the above mentions, the first field lens 140 of the present embodiment is designed to let a portion of the illumination light beam (i.e. the stray light beam 113S) reflected by the first concave surface 142 could deviate from an effective light receiving range of the projection lens 130. That is, an incident angle of the stray light beam 113S which is incident to the projection lens 130 is greater than the effective light receiving angle of the projection lens 130. Such that, the ghost image could be reduced and display quality of the projection apparatus 100 could be increased.

More specifically, the first field lens 140 is designed to have the first concave surface 142 facing the projection lens 130. The stray light beam 113S reflected by the first concave surface 142 may not be incident to the projection lens 130 due to a profile of the first concave surface 142. Even though the stray light beam 113S reflected from the first concave surface 142 is incident to the projection lens 130, the incident angle of the stray light beam 113S is increased due to the profile of the first concave surface 142. Therefore, the incident angle of the stray light beam 113S could be greater than the effective light receiving angle of the projection lens 130. Such that, the stray light beam 113S could not be projected onto the screen, so the ghost image can be reduced and the display quality of the projection apparatus 100 could be increased.

In the embodiment, the optical axis of the illumination light beam 113 passes through a predetermined portion 143 of the first concave surface 142. To further ensure that the incident angle of the stray light beam 113S could be greater than the effective light receiving angle of the projection lens 130, an included angle θ between the optical axis of the illumination light beam 113 and a normal line N of the predetermined portion 143 of the first concave surface 142 can be designed to be greater than the effective light receiving angle of the projection lens 130. More specifically, an absolute value of the effective light receiving angle of the projection lens 130 is, for example, between zero and 20 degrees, the included angle θ is, for example, between 20 degrees and 40 degrees, and a radius of curvature of the first concave surface 142 is, for example, smaller than or equal to 250 millimeters and greater than zero.

Figure 2A:
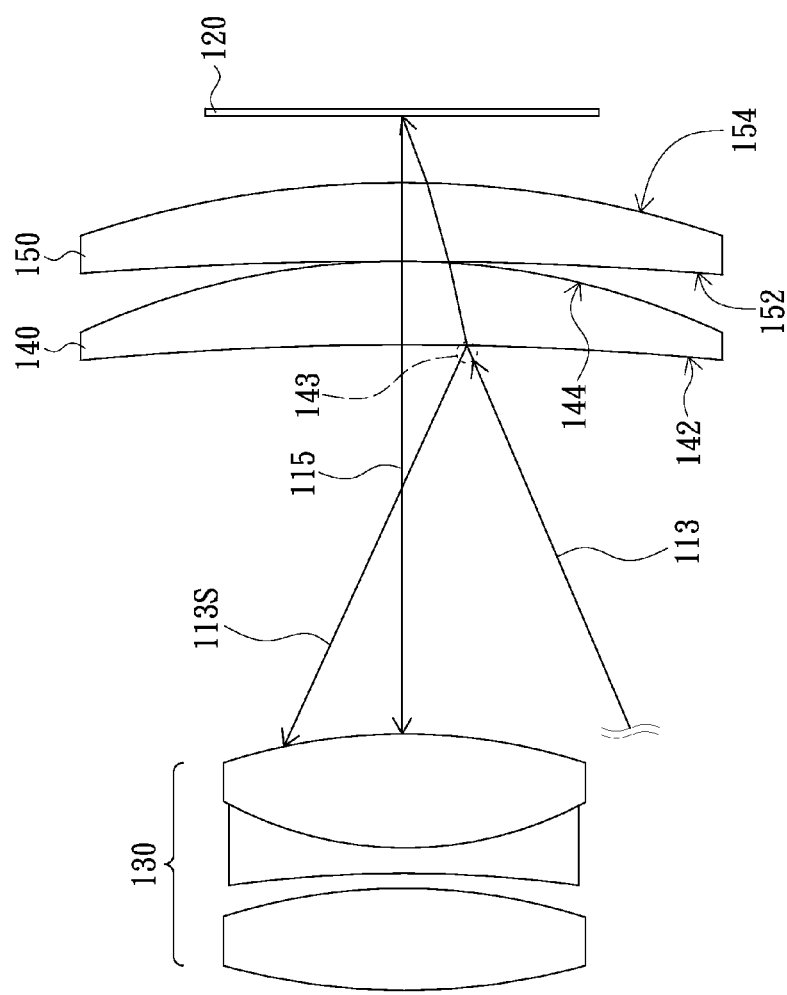
FIG. 2A is a schematic view showing a transmission path of a stray light beam reflected from a predetermined portion which is near an optical axis of a projection lens.
Figure 2B:
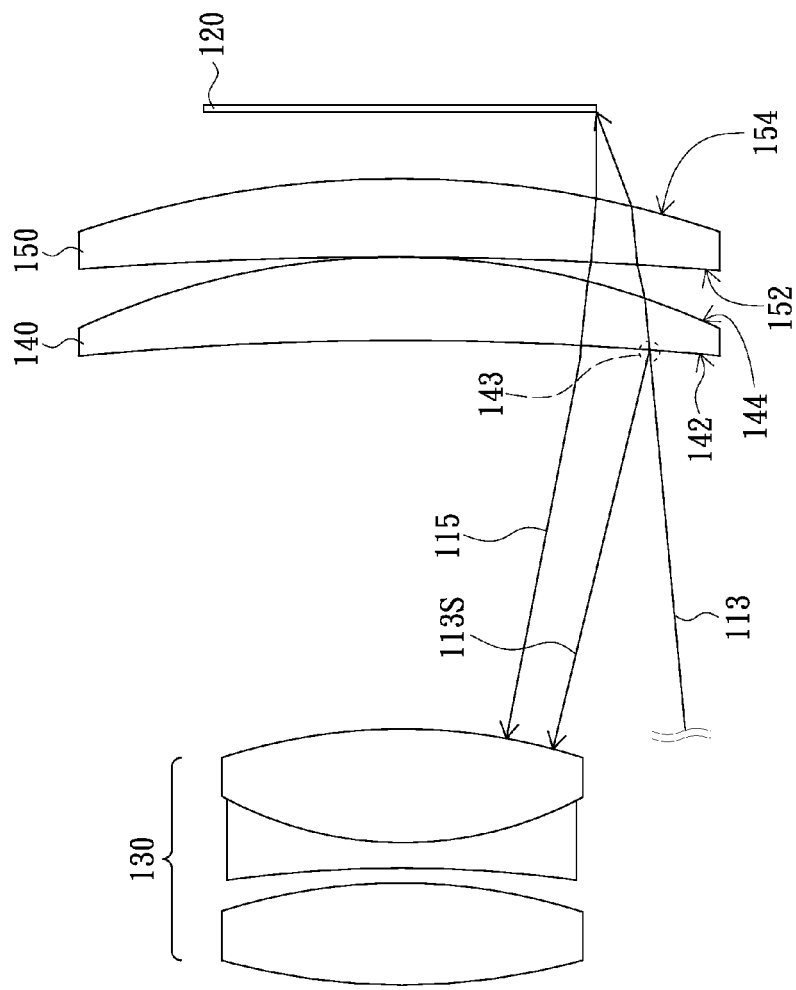
FIG. 2B is a schematic view showing a transmission path of a stray light beam reflected from a predetermined portion which is far away from an optical axis of a projection lens.

Referring to FIG. 2A, when the predetermined portion 143 of the first concave surface 142 is near an optical axis of the projection lens 130, the incident angle of the stray light beam 113S which is incident to the projection lens 130 can be increased to be greater than the effective light receiving angle of the projection lens 130. Referring to FIG. 2B, when the predetermined portion 143 of the first concave surface 142 is far away from the optical axis of the projection lens 130, the incident angle of the stray light beam 113S which is incident to the projection lens 130 also can be increased to be greater than the effective light receiving angle of the projection lens 130. Therefore, no matter the predetermined portion 143 is near or far away from the optical axis of the projection lens 130, the incident angle of the stray light beam 113S which is incident to the projection lens 130 could be increased to be greater than the effective light receiving angle, so the ghost image caused by the stray light beam reflected from the first concave surface 142 could be prevented.

Similarly, the incident angles of the stray light beams reflected from a first convex surface 144 of the first field lens 140, the second concave surface 152 and a second convex surface 154 of the second field lens 150 which are incident to the projection lens 130 also could be increased to be greater than the effective light receiving angle of the projection lens 130 due to profiles of the first convex surface 144, the second concave surface 152 and the second convex surface 154.

Therefore, the ghost image caused by the stray light beams reflected from the first convex surface 144, the second cave surface 152 and the second convex surface 154 could be reduced.

Furthermore, when the radius of curvature of the surface of filed lens is too small, aberration such as curvature of field or astigmatism may be produced. In view of this, in the embodiment, two field lenses (i.e. the first field lens 140 and the second field lens 150) are used to reduce the aberration, and the image quality of the projection apparatus 100 is consequently increased.

In summary, the projection apparatus of the embodiments of invention has at least one of the following advantages:

1. The stray light beams reflected from the surfaces of the first field lens and the second field lens could deviate from the light receiving angle of the projection lens, so that the ghost image could be reduced.

2. The projection apparatus uses two field lenses, so the aberration could be reduced and the image quality of the projection apparatus is consequently increased.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projection apparatus, comprising:
an illumination system capable of providing an illumination light beam;
a light valve disposed in a transmission path of the illumination light beam and capable of converting the illumination light beam into an image light beam;
a projection lens disposed in a transmission path of the image light beam;
a first field lens disposed between the light valve and the projection lens and in the transmission path of the illumination light beam and the transmission path of the image light beam, and the first field lens being a positive meniscus lens with a first concave surface facing the projection lens and a first convex surface opposite to the first concave surface; and
a second field lens disposed between the light valve and the first field lens and in the transmission path of the illumination light beam and the transmission path of the image light beam, and the second field lens being a positive meniscus lens with a second concave surface adjacent to the first field lens and a second convex surface facing the light valve,
wherein the illumination light beam and the image light beam pass through the first concave surface of the first field lens, a radius of curvature of the first concave surface is smaller than or equal to 200 millimeters and greater than zero, a stray light beam of the illumination light beam reflected by the first concave surface deviates from an effective light receiving range of the projection lens, and the first field lens and the second field lens are configured to reduce aberration.

2. The projection apparatus as claimed in claim 1, wherein the first field lens and the second field lens are spherical lenses.

3. The projection apparatus as claimed in claim 1, wherein the first field lens and the second field lens are aspheric lenses.

4. The projection apparatus as claimed in claim 1, wherein one of the first field lens and the second field lens is a spherical lens and the other one of the first field lens and the second field lens is an aspheric lens.

5. The projection apparatus as claimed in claim 1, wherein an optical axis of the illumination light beam passes through a predetermined portion of the first concave surface, and an included angle between the optical axis of the illumination light beam and a normal line of the predetermined portion of the first concave surface is greater than an effective light receiving angle of the projection lens.

6. The projection apparatus as claimed in claim 5, wherein an absolute value of the effective light receiving angle of the projection lens is between zero and 20 degrees, and the included angle between the optical axis of the illumination light beam and the normal line of the predetermined portion of the first concave surface is between 20 degrees and 40 degrees.

* * * * *